(12) United States Patent
Robbins, III et al.

(10) Patent No.: US 6,183,833 B1
(45) Date of Patent: *Feb. 6, 2001

(54) DESK CHAIRMAT WITH HANDLES AND HANG TABS

(75) Inventors: Edward S. Robbins, III, 2802 E. Avalon Ave., Muscle Shoals, AL (US) 35661; Gary L. House, Rogersville; John D. Carlton, Florence, both of AL (US)

(73) Assignee: Edward S. Robbins, III, Muscle Shoals, AL (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/238,737

(22) Filed: Jan. 28, 1999

(51) Int. Cl.$^7$ ........................................................ B32B 3/06
(52) U.S. Cl. ............................ 428/80; 428/99; 428/156; 428/167; 428/81; 428/192
(58) Field of Search ................... 428/99, 192, 80, 428/81, 156, 167, 120; 383/4; 248/346.01; 5/417

(56) References Cited

U.S. PATENT DOCUMENTS

| | | |
|---|---|---|
| 3,323,151 | 6/1967 | Lerman . |
| 4,370,767 | 2/1983 | Fraser . |
| 4,574,101 | 3/1986 | Tricca et al. . |
| 4,784,888 | 11/1988 | Schwertner et al. . |
| 4,940,620 | 7/1990 | Silk et al. . |
| 5,073,428 | 12/1991 | Lancelot et al. . |
| 5,190,200 * | 3/1993 | Hammerlund ........................ 225/42 |
| 5,425,444 * | 6/1995 | Chapman ............................. 206/6.1 |
| 5,439,405 | 8/1995 | Storey et al. . |
| 5,577,730 * | 11/1996 | Vannozzi ............................. 273/260 |
| 5,916,658 * | 6/1999 | Mohr .................................... 428/81 |

\* cited by examiner

Primary Examiner—Alexander S. Thomas
(74) Attorney, Agent, or Firm—Nixon & Vanderhye P.C.

(57) ABSTRACT

A desk chairmat includes a semi-rigid substantially planar member having four side edges, an upper side of the chairmat having a substantially smooth surface and at least one hang tab attached to the chairmat along one or more of the side edges. The chairmat may also have integral handles and an integral hinge to facilitate folding of the mat.

12 Claims, 3 Drawing Sheets

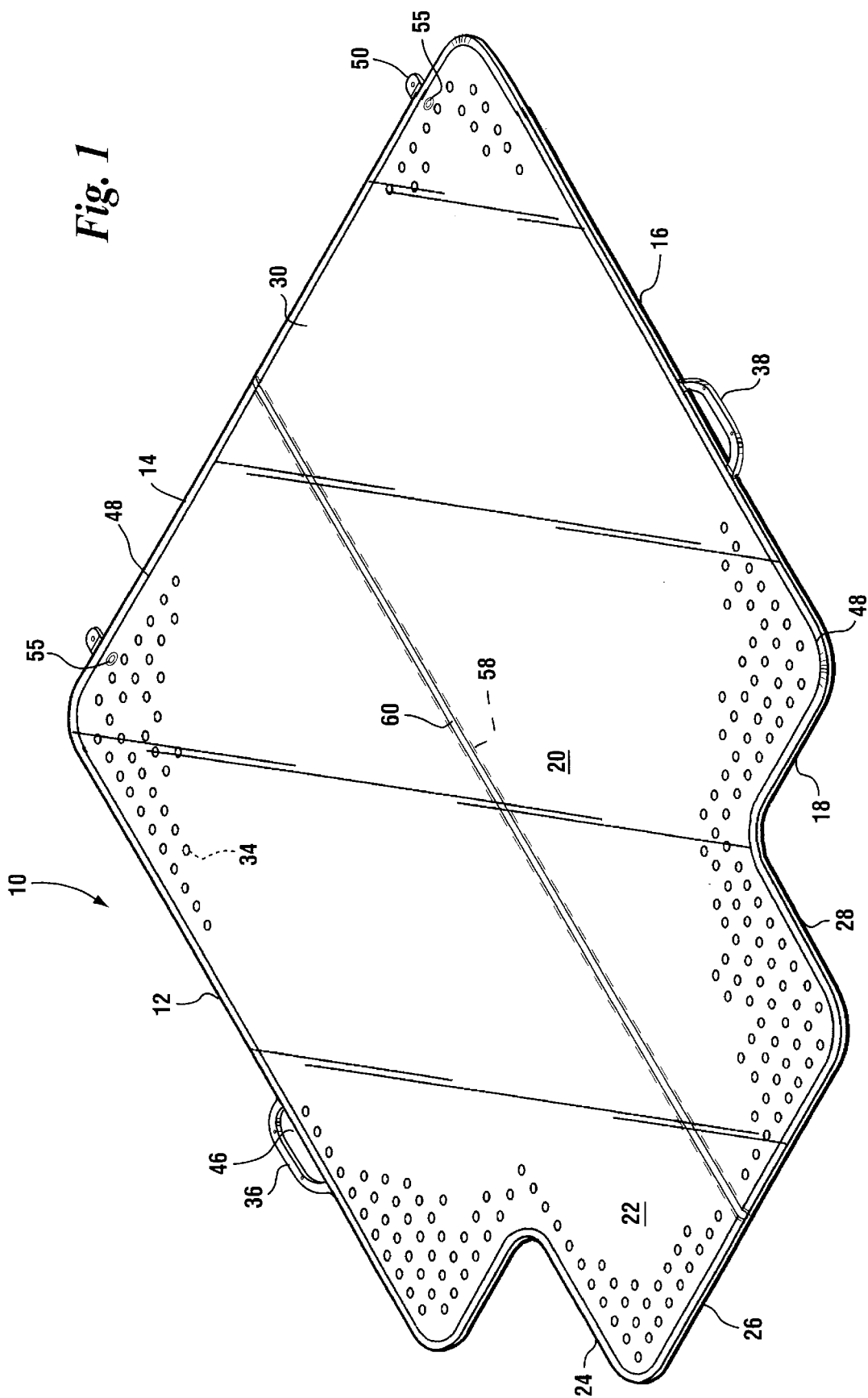

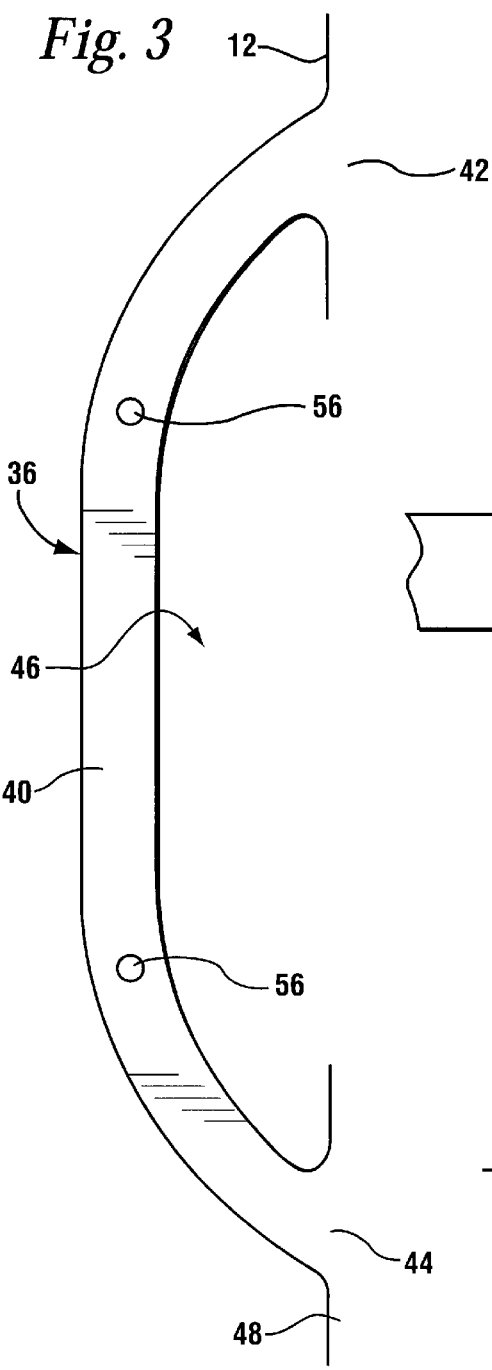
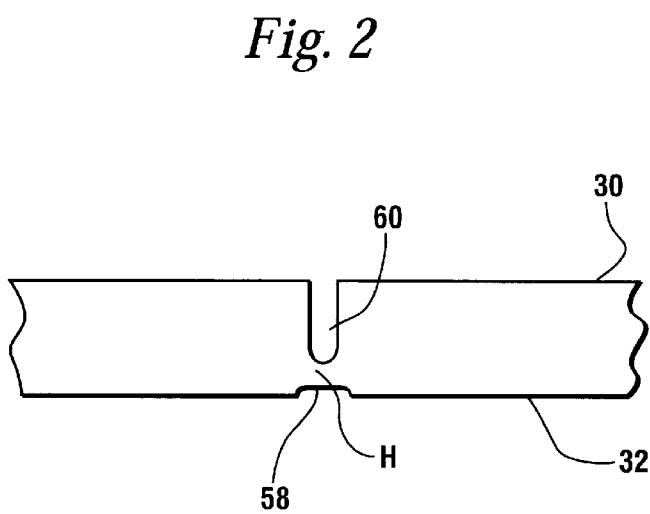
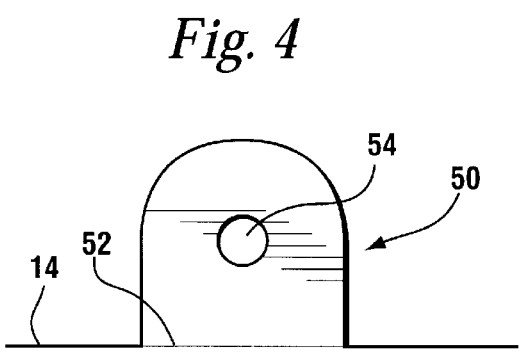
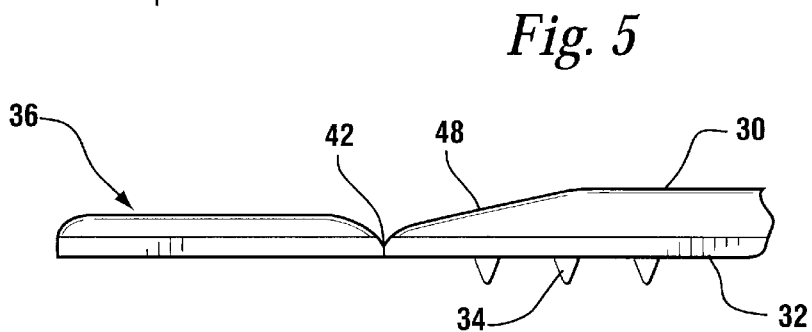

DESK CHAIRMAT WITH HANDLES AND HANG TABS

RELATED APPLICATIONS

This application is generally related to application Ser. No. 09/097,586, filed Jun. 16, 1998 entitled "Desk Chairmat With Handles And Related Process"; and application Ser. No. 09/110,205, filed Jul. 6, 1998 also entitled "Desk Chairmat With Handles And Related Process".

TECHNICAL FIELD

This invention relates to chairmats and specifically, to chairmats typically used under desk chairs in order to protect the underlying carpet or hard flooring.

BACKGROUND

Desk chairmats for office and home use are well known. Such chairmats typically have a main portion on which the desk chair rolls, and a forward lip portion which is adapted to extend partially under the desk well, and on which the feet of the person sitting in the chair may rest. Desk chairmats which are to be applied over carpeting typically have short but relatively sharp spikes on the undersides thereof which hold the mats firmly in place.

The above described desk chairmats, and particularly those with spikes, are difficult to carry and/or otherwise handle due to their relatively large size and the semi-rigid nature of the material from which they are formed. Unless the chairmat is boxed or otherwise protected, the user typically carries the chairmat by gripping about one or two of the edges of the chairmat, often resulting in irritation if not injury to the hands, due to the spikes projecting from the underside of the chairmat.

Some attempts have been made to solve the problem, but only to the extent of making the chairmats foldable to thereby reduce their size for handling purposes. See, for example, U.S. Pat. No. 5,073,428 and commonly owned U.S. Pat. No. 4,784,888.

For the most part, desk chairmats have been sold at office supply stores or distributors as opposed to retail stores, so that to some extent, the handling problem was alleviated by boxing the chairmats individually or in groups prior to shipping. However, even when supplied from a distributor in boxed form, the end user has to remove the chairmat from the box and carry it to its final destination, again, with some difficulty due to the physical attributes of the chairmat. In any event, chairmats are now being found increasingly in retail outlets, compounding the problem and while it is recognized that the chairmats may be boxed, the fact is that boxes add cost and are themselves unwieldy, and are therefore not likely to be used to any great extent in the retail environment. Thus, with increasing retail activity, new displays are also required. Conventional chairmats, because of their bulky and somewhat unwieldy configuration, present display problems since, absent the use of boxes, they do not stand alone unless wound. Even standing on edge in a wound or partially wound state, however, the mats are relatively unstable and, in any event, this is not a viable display arrangement.

Accordingly, there remains a need for a solution to the problem of transporting desk chairmats easily and safely, particularly those chairmats which have carpet spikes, and to the problem of displaying and stocking chairmats in a retail environment.

SUMMARY OF THE INVENTION

This invention relates to the incorporation of integral handles and hang tabs in desk chairmats. One prior impediment to putting permanent handles on a desk chairmat, or within the periphery of the mat, was that the handles themselves might interfere with the desired free rolling of chair casters on the chairmat. For example, if such handles were to be applied to the chairmat, one can imagine the desk chair casters or user's shoe heels becoming caught within a handle opening.

In accordance with this invention, desk chairmats with handles are disclosed which solve the handling problem and which can be easily removed by the purchaser with, for example, a pair of scissors. In addition, the desk chairmats have one or more integral hang facilitating mechanisms.

In a first exemplary embodiment, integral handles are molded in place on opposite sides of the chairmat. With this arrangement, the chairmat may be pulled together (by a partial rolling or folding of the chairmat with the carpet spikes facing inwardly) so that the two handles align, thereby not only reducing the profile of the chairmat, but also forming a single stronger handle enabling the user to carry the chairmat without difficulty. In this exemplary embodiment, the handles are connected to the respective chairmat edges by webs which permit the handles to be cut away from the chairmat once the chairmat is in its final location. Tear-away or other handle arrangements as described in the above identified commonly owned applications may also be utilized.

It is another feature of the invention to include one or more integral hang tabs along one or more sides of the chairmat to facilitate display and stocking, particularly in the retail environment. The tab may be in the form of an integral strap or loop, or a solid tab with a hole sized to fit over a display hook. Alternatively, the handle straps or loops themselves may have one or more apertures for purposes of hanging the mat. In still another alternative, one or more holes may be formed within the mat periphery to facilitate hanging.

It is another feature of the invention to include, optionally, aligned longitudinal grooves on both sides of the mat, extending midway between and parallel to those edges on which the handles are located, thereby providing an integral hinge, facilitating the folding of the chairmat and the bringing of the handles into engagement, to thereby permit easier transport due to reduced overall profile of the mat. In another version, only a single groove on the top surface of the mat is utilized to provide a folding hinge.

Accordingly, in its broader aspects, the present invention relates to a desk chairmat comprising a semi-rigid substantially planar member, the member having four side edges, an upper side of the chairmat having a substantially smooth surface and at least one hang tab attached to the chairmat along one or more of the side edges.

In another aspect, the invention relates to a desk chairmat comprising a semi-rigid substantially planar member, the member having at least four side edges; an upper side of the chairmat having a substantially smooth surface and a lower side of the chairmat having a plurality of spikes projecting therefrom; and at least one integral hang tab located along one of the side edges, said hang tab having an aperture therein adapted to permit the chairmat to hang from a support.

In another aspect, the invention relates to a desk chairmat comprising a semi-rigid substantially planar member, the member having four side edges, an upper side and a lower side; and a hinge extending substantially along a middle portion of the mat between two opposite of the four side edges, the hinge formed by vertically aligned first and second grooves on the upper and lower sides, respectively.

In still another aspect, the invention relates to a desk chairmat comprising a semi-rigid substantially planar member, the member having four side edges, an upper side and a lower side; and an integral living hinge extending substantially along a middle portion of the mat between two opposite of the four side edges, the hinge formed by at least one groove formed in the upper side of the planar member, the groove having a depth sufficient to leave a residual web to create the living hinge for folding.

In another aspect, the invention relates to a desk chairmat comprising a semi-rigid substantially planar member, the member having four side edges, an upper side of the chairmat having a substantially smooth surface and at least one aperture within the periphery of the planar member.

Additional features and advantages of the subject invention will become apparent from the detailed description which follows.

BRIEF DESCRIPTION OF THE DRAWINGS

FIG. 1 is a perspective view of a chairmat in accordance with a first exemplary embodiment of the invention;

FIG. 2 is a partial front view of the chairmat shown in FIG. 1;

FIG. 3 is an enlarged detail illustrating a chairmat handle in accordance with the invention;

FIG. 4 is an enlarged detail of a hang tab in accordance with the invention;

FIG. 5 is a partial end view of the chairmat shown in FIG. 1;

BEST MODE FOR CARRYING OUT THE INVENTION

Figure 6:
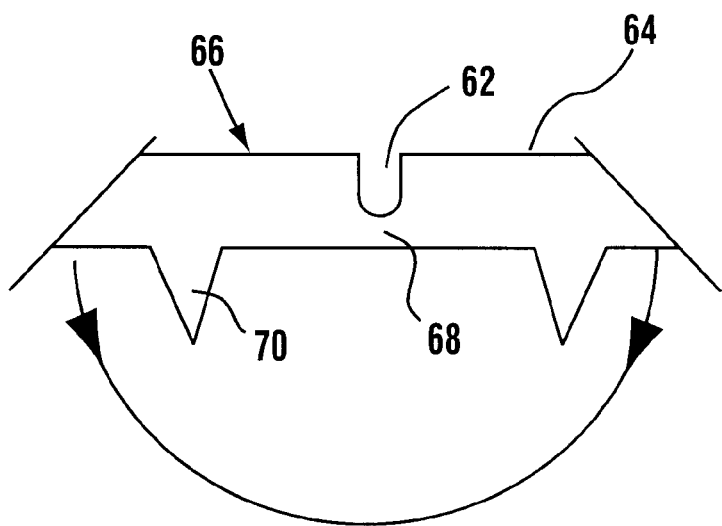
FIG. 6 is a partial front view of a chairmat in accordance with another exemplary embodiment of the invention.

With reference to FIG. 1, a desk chairmat 10 includes a planar, semi-rigid member (made from, e.g., PVC, polypropylene, semi-rigid vinyl or other suitable material) having four side edges 12, 14, 16 and 18, which define a major portion 20 of the chairmat. An optional lip extension portion 22 of the same material and thickness, projects or extends integrally from side edge 18, and is further defined by edges 24, 26, 28. The lip extension 22, as is well known, is designed to project into the well area of a desk, with the remainder of the chairmat behind the desk and serving as the principal contact area for a desk chair (not shown) typically (but not necessarily) fitted with rollers or casters. The chairmat for purposes of this invention, however, need not have a lip extension of this type. The upper surface 30 of the chairmat is generally smooth, while the lower surface may be formed with a substantial number of relatively short but relatively sharp spikes 34 which are used to anchor the chairmat to an underlying carpet. As is well understood in the art, chairmats for use on hard flooring do not require such spikes. Note that spikes are not shown in all of the various mats illustrated in the Figures, and while the invention here is particularly beneficial in those instances where spikes are present, it is, of course, applicable to mats without spikes as well.

In accordance with an exemplary embodiment of this invention, the chairmat 10 is formed with a pair of integral handles 36, 38 which project from opposite side edges 12 and 16, i.e., the handles lie outside the periphery of the chairmat. While the location of the handles can vary, placing them along the longer sides of the chairmat is preferred since it requires minimal folding/rolling (as described below) and because, as folded, it produces a substantially cylindrical package of less height which is easier to carry. It is also advantageous to locate the handles in alignment with the center of mass of the chairmat so that the latter is balanced when gripped by the aligned handles. Since the handles 36, 38 are identical, only one need be described in detail.

With further reference to FIG. 3, handle 36 comprises a loop 40 connected at opposite ends thereof to the edge 12 along a pair of webs 42, 44, each of which having a length of about ⅜", but this dimension may vary. The loop 40 is arranged to form a handle opening 46. Note also that in the presently described embodiment, the chairmat is formed with an otherwise known ramp or tapered marginal edge 48 (FIGS. 3 and 5) which extends about the entire periphery of the chairmat. Thus, where the handle loop 40 is joined to the edge 12 along the pair of webs 42, 44. The handle loop thickness may be the same as (but is preferably less than) the maximum thickness of the chairmat. This arrangement results in a handle which is easily cut away from the mat.

The above described chairmat constructions can be made in accordance with various known plastic forming techniques including stamping of preformed sheets. The preferred technique, however, is as described in commonly owned U.S. Pat. No. 5,213,741, incorporated herein by reference.

Note that while the handles are described in terms of a "pair" of such handles, single handles may be used as well. In addition, the one or two handles can be located along any of the side edges of the chairmat. Moreover, the shape of the handle, i.e., arcuate, rectangular, etc. may also be varied as desired.

It is another feature of this invention to include one or more hang tabs 50 along one or more side edges of the chairmat. FIG. 1 shows two such hang tabs along side edge 16. As best seen in FIG. 4, tab 50 is a solid protrusion or projection integrally formed with the mat, and connected along a thinned web 52 (similar to web 44 associated with handles 36, 38). Tabs 50 are formed with holes or apertures 54 which enable the mat to be suspended from display hooks or the like.

In a variation of this design, one or more small holes 55 may be formed within the periphery of the mat to facilitate hanging.

Alternatively, handles 36, 38 may be provided with holes 56 (see FIG. 3) so that the handles themselves may also serve as hang tabs if desired.

With reference now to FIGS. 1 and 2, a unique folding arrangement in the chairmat 10 is illustrated. More specifically, the fold line is provided in the form of a first elongated groove 58 in the underside 32 of the mat, and a second, elongated groove 60 on the top surface 30, in generally vertical alignment with groove 58. The upper groove 60 is approximately 0.125 inch wide and extends about 0.080 into the thickness of the mat. Groove 58, on the other hand, is about 0.250 inch wide and has a depth of only about 0.005 inch. In this example, the "connecting web" between the two grooves is about 0.008 inch thick and creates a "living hinge" H which permits easy folding. The living hinge thickness may vary, however, from about 0.008 to about 0.020 inch.

It is preferable that the grooves 58, 60 extend substantially the full length of the mat terminating immediately adjacent the tapered ramp 48, i.e., about 1 inch short of the edges. It is possible, however, to extend the grooves fully through the tapered ramp edges.

Figure 7:
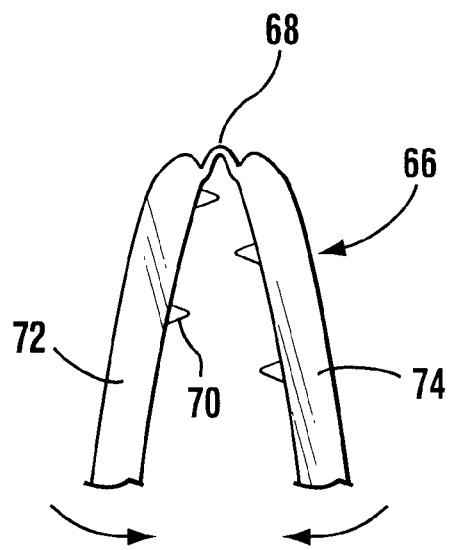
FIG. 7 is a partial front view of the mat shown in FIG. 6 but with the mat folded about a center hinge.

In FIGS. 6 and 7, an alternative groove configuration is illustrated. Specifically, a single substantially U-shaped groove 62 extends along only the top surface 64 of the chairmat 66, extending to a depth of about 0.080 inch. This leaves a thin web or "living hinge" 68, having a thickness of about 0.020 inch.

FIG. 7 shows the manner in which the mat is easily folded inwardly to hide or cover the carpet spikes 70, with the living hinge 68 permitting the two half portions 72, 74 of the mat 66 to lie substantially parallel to one another without any significant stretching of the mat in the area of the hinge.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A desk chairmat adapted for use over a carpet and for supporting a desk chair, the chairmat comprising a semi-rigid substantially planar member, said member having four side edges with a lip portion adapted to extend into a well area under the desk; an upper side of the chairmat having a substantially smooth surface; a pair of hang tabs formed integrally with said substantially planar member and projecting away from one of said four side edges, said hang tab having a relatively small aperture formed therein and adapted to receive a display support member.

2. A desk chairmat comprising a semi-rigid substantially planar member, said substantially planar member having four side edges, an upper side of said substantially planar member having a substantially smooth surface; and a pair of integral handles formed on two of said four side edges, each handle including a strap having a pair of ends integral with the chairmat, and wherein said strap includes at least one hole sized to permit the chairmat to hang from a support.

3. A desk chairmat comprising a semi-rigid substantially planar member, said member having four side edges, an upper side of the chairmat having a substantially smooth surface; at least one hang tab attached to said chairmat along a first of said side edges, said hang tab comprising an integral projection with an aperture therein; and further comprising a pair of integral handles along second and third opposite ones of said four side edges.

4. A desk chairmat comprising a semi-rigid substantially planar member, said member having at least four side edges; an upper side of the chairmat having a substantially smooth surface and a lower side of the chairmat having a plurality of spikes projecting therefrom; at least one integral hang tab located along one of said side edges, said hang tab having a relatively small hole therein adapted to permit the chairmat to hang from a support; and a pair of integral handles along two opposite ones of said four side edges.

5. A desk chairmat comprising a semi-rigid substantially planar member, said member having four side edges, an upper side of the chairmat having a substantially smooth surface; a pair of integral hang tabs attached to said chairmat along a first of said four side edges, and a pair of handles located along second and third of said four side edges wherein said second and third of said four side edges are opposite each other.

6. The desk chairmat of claim 5 and including a lip portion extending away from a fourth of said four side edges, opposite said one of said four side edges.

7. The desk chairmat of claim 5 wherein said pair of hang tabs comprise projections integrally formed along said one of said four sides, said projections each having an aperture therein.

8. The desk chairmat of claim 5 and further comprising at least one elongated folding groove extending along one of the length and width dimensions of said substantially planar member, and passing through the center of the chairmat.

9. The chairmat of claim 5 and further comprising first and second aligned grooves formed in opposite sides of said substantially planar member to thereby create a living hinge to facilitate folding.

10. The chairmat of claim 9 wherein said first groove is formed in said upper side and is narrower and deeper than said second groove formed in said lower side.

11. The chairmat of claim 5 wherein said material comprises polyvinylchloride.

12. The chairmat of claim 5 wherein said material comprises polypropylene.

\* \* \* \* \*